(12) United States Patent
Frasch et al.

(10) Patent No.: US 7,983,825 B2
(45) Date of Patent: Jul. 19, 2011

(54) METHOD AND TRANSMISSION ARRANGEMENT FOR CHANGING GEARS

(75) Inventors: Michael Frasch, Ulm (DE); Karl-Heinz Vogl, Ummendorf (DE); Peter Dschida, Ulm (DE)

(73) Assignee: Brueninghaus Hydromatik GmbH, Eichingen (DE)

( * ) Notice: Subject to any disclaimer, the term of this patent is extended or adjusted under 35 U.S.C. 154(b) by 341 days.

(21) Appl. No.: 12/066,570

(22) PCT Filed: Oct. 27, 2006

(86) PCT No.: PCT/EP2006/010377
§ 371 (c)(1),
(2), (4) Date: Mar. 12, 2008

(87) PCT Pub. No.: WO2007/048631
PCT Pub. Date: May 3, 2007

(65) Prior Publication Data
US 2008/0208421 A1    Aug. 28, 2008

(30) Foreign Application Priority Data

Oct. 27, 2005   (DE) .......................... 10 2005 051 481
Dec. 9, 2005    (DE) .......................... 10 2005 058 937

(51) Int. Cl.
*F16H 61/04* (2006.01)
(52) U.S. Cl. ........................................... 701/54
(58) Field of Classification Search .................. 701/54; 74/733.1, 731.1; 477/52, 68; 60/434, 444, 60/468, 494
See application file for complete search history.

(56) References Cited

U.S. PATENT DOCUMENTS

| | | | | | |
|---|---|---|---|---|---|
| 4,967,610 | A | * | 11/1990 | Sasajima et al. | 477/68 |
| 5,003,776 | A | * | 4/1991 | Kanai et al. | 60/434 |
| 5,505,113 | A | * | 4/1996 | Wiest | 74/733.1 |
| 2003/0216847 | A1 | * | 11/2003 | Bellinger | 701/51 |

FOREIGN PATENT DOCUMENTS

| | | |
|---|---|---|
| DE | 40 26 659 A1 | 2/1991 |
| DE | 42 23 846 A1 | 1/1994 |
| DE | 44 31 864 A1 | 3/1996 |
| EP | 0 282 010 A2 | 9/1988 |
| EP | 0 752 545 A2 | 1/1997 |
| EP | 1 076 194 A2 | 2/2001 |
| EP | 1 277 991 A2 | 1/2003 |

* cited by examiner

*Primary Examiner* — James P Trammell
(74) *Attorney, Agent, or Firm* — Scully, Scott, Murphy & Presser, P.C.

(57) ABSTRACT

The invention concerns a method and a transmission arrangement for changing gears in a transmission with a hydrostatic transmission and a manual gearbox (4) connected downstream from it. First the output torque of a hydrostatic motor (9) is reduced. After the reduction of the output torque of the hydrostatic motor (9), an engaged gear (12, 13) of the manual gearbox (4) which is connected downstream is disengaged. An output rotational speed of the hydrostatic motor (9) corresponding to the gear (13, 12) to be engaged is determined. The gear ratio of the hydrostatic transmission is then adjusted, so that the output rotational speed of the hydrostatic motor (9) is higher than the determined corresponding output rotational speed. After this increased output rotational speed is reached, the gear (13, 12) to be engaged is engaged.

8 Claims, 1 Drawing Sheet

METHOD AND TRANSMISSION ARRANGEMENT FOR CHANGING GEARS

BACKGROUND OF THE INVENTION

1. Field of the Invention

The invention concerns a method and transmission arrangement for changing gears in a transmission with a hydrostatic transmission and a manual gearbox connected downstream from it.

2. Discussion of the Prior Art

To increase the possible range of gear ratios of a hydrostatic transmission, connecting a manual gearbox downstream from the hydrostatic transmission is known. Such a transmission arrangement is known from DE 42 23 846 A1. To be able to change gear in the downstream manual gearbox, the hydraulic motor of the hydrostatic transmission is set to a pivoting angle of approximately 0. In this way the output torque of the hydrostatic transmission is reduced so much that almost load-free changing of the engaged gears in the downstream manual gearbox is possible. The required change of rotational speed of the output shaft of the hydraulic motor is made by the synchroniser rings of the downstream manual gearbox. In this way, after an engaged gear is disengaged by the application of the synchroniser ring of the gear to be engaged, the hydraulic motor, which can be rotated practically without moment, is brought to the rotational speed which corresponds to the gear to be engaged.

It has been shown to be disadvantageous that because of the large rotational speed jumps, the wear on the synchroniser rings is considerable. In particular, because of the inert mass of the hydraulic motor and the existing drag torque of the hydraulic motor, the synchroniser is considerably stressed. When the synchroniser rings are applied while the next gear is being engaged, it is also disadvantageous that the suddenly occurring additional moment of the hydraulic motor ensures a considerable shifting jolt.

SUMMARY OF THE INVENTION

It is therefore the object of the invention to create a method and transmission arrangement for changing gears in a transmission with a hydrostatic transmission and a manual gearbox connected downstream from it, such that the stress on the synchroniser is reduced and thus the lifetime of the synchroniser is extended.

According to the method according to claim 1 and the transmission arrangement according to claim 9, when the gears of a manual gearbox which is connected downstream from a hydrostatic transmission are changed, first the output torque of the hydrostatic motor is reduced. By reducing the output torque of the hydraulic motor, the downstream manual gearbox is set at least approximately load-free, so that the gear which was engaged until then can easily be disengaged. Depending on the driving situation, the rotational speed of the hydrostatic motor corresponding to the gear to be engaged next is determined by an electronic control unit. The gear ratio of the hydrostatic transmission is then set so that the actual rotational speed of the hydrostatic motor is above the determined corresponding rotational speed. The gear to be engaged is then engaged, while the synchroniser, which is present in the downstream manual gearbox, adjusts the actual rotational speed of the hydrostatic motor to the driving situation by reducing the rotational speed of the hydrostatic motor. The output rotational speed is always reduced during synchronisation, irrespective of the direction of the gear change.

After the gear change is complete, in the traditional way the gear ratio of the hydrostatic transmission is regulated by corresponding adjustment of the hydrostatic machines.

Adjusting the gear ratio so that the rotational speed of the hydraulic motor is slightly above the determined output rotational speed has the advantage that no acceleration of the hydrostatic motor by the synchroniser must take place. Instead, the final rotational speed of the output shaft of the hydraulic motor is reached by a slight reduction of the output rotational speed of the hydraulic motor. With this deceleration of the hydraulic motor, the internal friction of the hydraulic motor is also used to reduce its rotational speed. This results in a lower required work of friction by the synchroniser. The wear on the synchroniser which is used is thus considerably reduced, and additionally gentler gear changes are made possible by reducing the shifting jolt.

Advantageous extensions of the method according to the invention are shown in the subclaims.

It is specially simple to cause the reduction of the output torque before the start of the gear changing process by reducing the swallowing capacity of the hydrostatic motor. Also, advantageously, the gear ratio of the hydrostatic transmission can be changed by adjusting the swallowing capacity of the hydraulic motor. In this case, a common electronic control unit can be used, in which case intervention in the regulation of the hydraulic pump is unnecessary. It is also advantageous, as well as adjusting the hydraulic motor, to include the displacement volume of the hydraulic pump in the adjustment process, to make specially large gear change jumps possible.

It is also specially advantageous, during the gear change, to control the time sequences using an electronic control unit so that the change of gear ratio of the hydrostatic transmission takes place simultaneously with a positioning movement of a positioning piston to change gears in the downstream manual gearbox. If the positioning movements for the gear change of the hydrostatic transmission take place fast enough, a continuous positioning movement of the actuating device to change gears can be provided. This has the advantage that during the gear change, a sliding gear of the manual gearbox does not have to be brought into an intermediate position corresponding to idling. Instead, a continuous positioning movement can move the sliding gear, and thus, in an uninterrupted process, first one gear can be disengaged and then another gear can be engaged.

BRIEF DESCRIPTION OF THE DRAWINGS

The method and transmission arrangement are explained in more detail below on the basis of the drive shown in the figure.

DETAILED DESCRIPTION OF THE INVENTION

Figure 1:
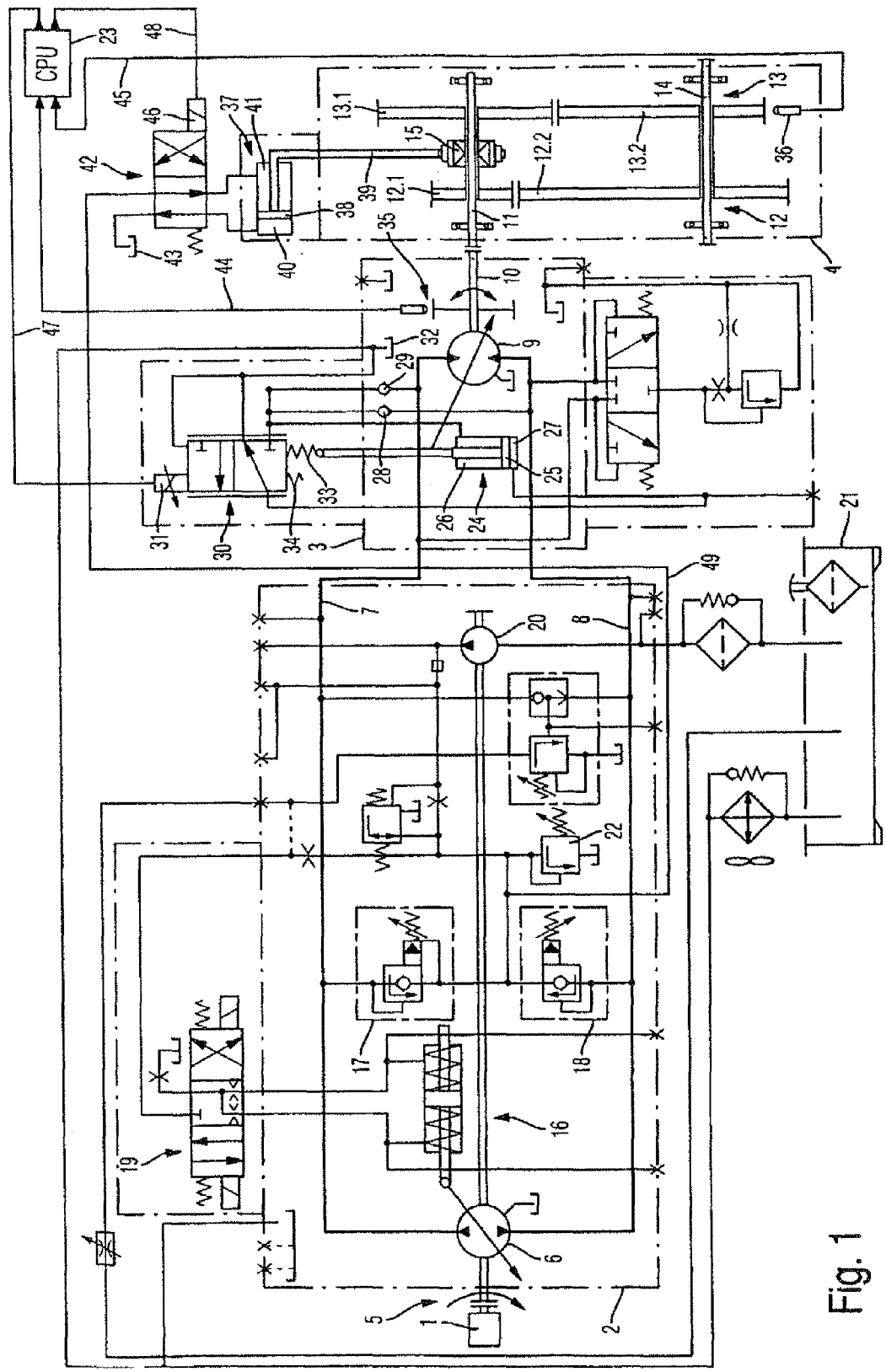
FIG. 1 shows a hydraulic circuit diagram of a hydrostatic-mechanical transmission arrangement according to the invention.

In FIG. 1, a hydrostatic-mechanical transmission arrangement is shown. In the hydrostatic-mechanical transmission, a hydraulic pump unit 2 is driven by a drive motor 1. The hydraulic pump unit 2 is connected hydrostatically to a hydraulic motor unit 3. A manual gearbox 4 is connected downstream from the hydraulic motor unit 3 and coupled mechanically to the hydraulic motor unit 3.

The hydraulic pump unit 2 is coupled via a drive shaft 5 to the drive motor 1, so that the hydraulic pump 6 of the hydraulic pump unit 2 is driven by the drive motor 1. The shown drive can be, for instance, a traction drive for construction, agricultural and forestry machines or similar vehicles.

In the shown embodiment, the hydraulic pump 6 is implemented as an adjustable hydraulic pump which conveys in both directions.

The hydraulic pump 6 is connected via a first working conduit 7 and a second working conduit 8 to the hydrostatic motor 9. The hydrostatic motor 9 is coupled to a drive shaft 10, which is connected to a transmission input shaft 11. The manual gearbox 4 has a first transmission stage 12 and a second transmission stage 13. The first transmission stage 12 and second transmission stage 13 each consist of a gear wheel pair, with first gear wheels 12.1 and 13.1 and second gear wheels 12.2 and 13.2 respectively. The first and second gear wheels 12.1 and 12.2 and 13.1 and 13.2 respectively are permanently engaged.

The first gear wheels 12.1 and 13.1 are arranged on the transmission input shaft 11 so that they can rotate freely, and can be connected via a sliding gear 15 to the transmission input shaft 11 so that they cannot rotate. On the sliding gear 15, there is a synchroniser, which when the rotation-resistant connection between the first gear wheel 12.1 or 13.1 and the transmission input shaft 11 is formed, brings the transmission input shaft 11 to a rotational speed which suits the rotational speed of the output shaft 14.

To adjust the gear ratio of the hydrostatic transmission, the hydraulic pump unit 2 is provided with an adjusting device 16, which acts on an adjusting mechanism of the hydraulic pump 6. To adjust the positioning pressures which act in the adjusting device 16, a positioning pressure regulating valve 19 is provided, and in the shown embodiment can be actuated electromagnetically.

The hydraulic pump unit 2 also has a feed device. The feed device includes a first feed valve unit 17 and a second feed valve unit 18. The feed valve units 17 and 18 supply hydraulic fluid to the working conduits 7 and 8, depending on the pressure conditions which occur. For this purpose, hydraulic fluid is sucked out of a tank volume 21 by an auxiliary pump 20. The hydraulic fluid which is sucked by the auxiliary pump 20 is conveyed into the feed device, the required positioning pressure being taken by the positioning pressure regulating valve 19 from the feed device to adjust the conveyed volume of the hydraulic pump 6. To secure the feed device, a pressure limiting valve 22 is provided.

To control the sequence during a gear change of the manual gearbox 4, an electronic control unit 23 is provided. The electronic control unit 23 controls the time sequence for both the hydraulic motor unit 3 and the manual gearbox 4. To actuate an adjusting mechanism of the hydrostatic motor 9, an adjusting device 24 is provided. The adjusting device 24 includes a double-acting hydraulic cylinder, in which a positioning piston 25 is arranged. The positioning piston 25 has two oppositely oriented positioning piston surfaces. The first positioning piston surface delimits a first positioning pressure space 26 in the adjusting device 24, and the second positioning piston surface delimits a second positioning pressure space 27.

The higher of the working pressures in the working conduits 7 and 8 is applied to the first positioning pressure space 26 via a first or second non-return valve 28, 29. The positioning pressure in the second positioning pressure space 27 can be regulated by a positioning pressure regulating valve 30. The positioning pressure regulating valve 30 can be actuated via an electromagnet 31. In the shown first end position of the positioning pressure regulating valve 30, the second positioning pressure space 27 is connected to a tank volume 32. If the positioning pressure regulating valve 30 is adjusted by the electromagnet 31 in the direction of its second end position, the higher of the working conduit pressures 7, 8 which are fed to the positioning pressure regulating valve 30 via the non-return valves 28 and 29 is similarly applied to the second positioning pressure space 27. The effective positioning piston area in the second positioning pressure space 27 is greater than in the first positioning pressure space 26. An increase of the positioning pressure in the second positioning pressure space 27 means an adjustment of the hydrostatic motor 9 in the direction of increased swallowing capacity.

The positioning movement of the positioning piston 25 is fed back via a coupling spring 33 to the positioning pressure regulating valve 30. The positioning pressure regulating valve 30 thus takes an equilibrium position, which is determined by the feedback spring 33, an adjusting spring 34 and the force, which acts in the opposite direction, of the electromagnet 31. To capture the output rotational speed of the output shaft 10 of the hydrostatic motor 9, a revolution counter 35 is provided. In the shown embodiment, the revolution counter 35 is implemented by a sensor and an induction sensor, which is connected to the output shaft 10.

The rotational speed of the transmission output shaft 14 is captured in the same way. For this purpose, a revolution counter 36, which, for instance, directly captures the rotational speed via the teeth of the second gear wheel 13.2 of the second transmission stage 13, is used. The revolution counters 35 and 36 generate a first rotational speed signal and a second rotational speed signal, which are fed to the electronic control unit 23.

To change the engaged gears in the manual gearbox 4, as explained above, the sliding gear 15, which is connected to the transmission input shaft 11 so that it cannot rotate but can move axially, is brought by an axial movement to engage with the first gear wheel 12.1 of the first transmission stage 12 or the first gear wheel 13.1 of the second transmission stage 13. As long as the sliding gear 15 does not engage with the first gear wheel 12.1 or first gear wheel 13.1, the first gear wheels 12.1 and 13.1 are carried on the transmission input shaft 11 so that they can rotate.

The movement of the sliding gear 15 is caused by a hydraulic actuating device 37. The hydraulic actuating device 37 is also in the form of a doubly acting hydraulic cylinder, in which an actuating piston 38 is arranged. The actuating piston 38 is connected via a piston rod to an actuating piston 39. The actuating piston 38 in turn divides the hydraulic cylinder of the actuating device 37 into a first positioning pressure space 40 and a second positioning pressure space 41. To change gear, the piston 38 is moved by changing the pressure ratios in the first positioning pressure space 40 and second positioning pressure space 41. The positioning pressures in the first positioning pressure space 40 and second positioning pressure space 41 are set via an on-off valve 42. The on-off valve 42 is a 4/2-way valve, which can be actuated against the force of a spring by an electromagnet 46.

In the output position of the on-off valve 42, shown in FIG. 1 and defined by the spring, the first positioning pressure space 40 of the actuating device 37 is released in the direction of a tank volume 43. Simultaneously, a positioning pressure, which is taken from the feed device of the hydraulic pump unit 2, is applied to the second positioning pressure space 41. If a positioning signal is applied to the on-off valve 42, the electromagnet 46 adjusts the on-off valve 42 into its second switching position against the force of the spring. In this second switching position, the feed pressure of the hydraulic pump unit 2 is now applied to the first positioning pressure space 40. Simultaneously, the second positioning pressure space 41 is released in the direction of the tank volume 43. Because of the changed hydraulic force ratios on the actuating piston 38, the actuating piston 38, the piston rod and the actuating rod 39 are actuated in the opposite direction. Thus by changing the pressure ratios in the actuating device 37, the sliding gear 15 is brought together with the first gear wheel 12.1 or first gear wheel 13.1 of the first or second transmission stage 12, 13 respectively.

The rotational speed signals which are determined by the revolution counter 35 or 36 are fed via corresponding signal lines 44, 45 to the common electronic control unit 23. The electronic control unit 23 outputs positioning signals to the electromagnet 31 and/or the electromagnet 46. For this purpose, the outputs of the electronic control unit 23 are connected via signal lines 47, 48 to the electromagnets 31 and 46 of the positioning pressure regulating valve 30 and on-off valve 42 respectively.

Below, the method of changing gears is described. The sliding gear 15 is engaged with the first gear wheel 12.1 of the first transmission stage 12. The driving speed is determined by the rotational speed of the drive motor 1 and the set gear ratio of the hydrostatic transmission consisting of the hydraulic pump unit 2 and hydraulic motor unit 3. Now, if the gear ratio of the downstream manual gearbox 4 is changed and thus the second transmission stage 13 is engaged, first the drive torque is reduced by changing the gear ratio of the hydrostatic transmission. In the simplest case, this happens when the swallowing capacity of the hydrostatic motor 9 is changed in the direction of a minimum value. In the simplest case, this minimum value is a vanishing swallowing capacity. This can be done, for instance, by setting a neutral position of a captive washer using a swash plate axial piston machine.

After the output torque of the hydrostatic transmission is reduced in the described manner, the electronic control unit 23 initiates the switching process. First the sliding gear 15 was engaged with the first gear wheel 12.1 of the first transmission stage 12. For this purpose, the first positioning pressure space 40 was connected to the tank volume 43 via the on-off valve 42. No current was supplied to the electromagnet 46 of the on-off valve 42, so that the on-off valve 42 was held by the compression spring in its first end position, shown in FIG. 1. The electronic control unit 23 now initiates the switching process, current being supplied to the electromagnet 46 and thus the on-off valve 42 being brought into its second end position. In this way the first positioning pressure space 40 is connected via the on-off valve 42 to the feed pressure conduit 49, and simultaneously the second positioning pressure space 41 is released into the tank volume 43. Consequently, the actuating piston 38 moves to the right in FIG. 1, so that the sliding gear 15 is increasingly removed from the gear wheel 12.1.

As soon as the engagement between the sliding gear 15 and the gear wheel 12.1 is released, the hydrostatic motor 9 is set to a new output rotational speed, which is above an output rotational speed or transmission input rotational speed of the transmission input shaft 11 corresponding to the gear to be engaged. This corresponding output rotational speed for the output shaft 10 is determined by the electronic control unit 23 on the basis of the gear ratio of the second gear 13 to be engaged. In this way, the rotational speed of the transmission output shaft 14, which is determined by the revolution counter 36, is taken into account, and thus the corresponding rotational speed of the transmission input shaft 11 and/or drive shaft 10 of the hydrostatic motor 9, after restoration of the drive connection, is determined.

Corresponding to the increased rotational speed of the hydrostatic motor 9 to be set, the electronic control unit 23 outputs a positioning signal to the electromagnet 31 via the signal line 47. The electromagnet 31 is preferably a proportional magnet, so that corresponding to the size of the positioning signal, the positioning pressure regulating valve 30 takes a position which corresponds to a specified swallowing capacity of the hydrostatic motor 9. The pivoting angle of the hydrostatic motor 9 is adjusted in the time which the actuating device 37 needs to release the connection of the sliding gear 15 to the gear wheel 12.1 and create the connection to the gear wheel 13.1. For this purpose, the electronic control unit 23 outputs the positioning signals to the electromagnets 35 and 46 in a temporally coordinated manner.

At the instant at which the positioning movement of the actuating device 37 is concluded, the hydrostatic motor 9 has already reached the increased rotational speed. The sliding gear 15 is now brought into engagement with the first gear wheel 13.1 of the second gear 13. In this way the transmission input shaft 11, which is connected to the output shaft 10 of the hydrostatic motor 9, is braked by the synchroniser, which is arranged on the sliding gear 15, and thus an equalisation of the rotational speed between the first gear wheel 13.1 of the second transmission stage 13 and the transmission input shaft 11 and thus the output shaft 10 of the hydrostatic motor 9 is achieved.

A switching process from the second transmission stage 13 to the first transmission stage 12 takes place correspondingly, by actuation of the actuating device 37 in the opposite direction. Here too, the output shaft 10 is brought to an increased rotational speed, which is above a determined corresponding rotational speed, which is defined by the actual rotational speed of the transmission output shaft 14 and the gear ratio of the first transmission stage 12, and the output rotational speed, which is measured by the second revolution counter 36, of the manual gearbox 4.

In the shown embodiment, positioning signals are supplied easily by the electronic control unit 23 only to the manual gearbox 4 and/or its actuating device 37 and the hydraulic motor unit 3. Equally well, however, the adjustment of the pivoting angle of the hydraulic pump 6 can be included in the control by the electronic control unit 23. In this case, when the gear ratio of the hydrostatic transmission is adjusted, both the pivoting angle of the hydraulic pump 6 and the pivoting angle of the hydrostatic motor 9 are changed. Alternatively, the rotational speed of the output shaft 10 can be adjusted by adjusting only the pivoting angle of the hydraulic pump 6, with a permanently set pivoting angle of the hydrostatic motor 9.

The invention is not restricted to the shown embodiment. Instead, combinations of individual features of the shown embodiment in any manner are possible.

The invention claimed is:

1. A method of changing first and second gears in a transmission with a hydrostatic transmission and a manual gearbox connected downstream therefrom, a synchronizer being arranged in said downstream manual gear box, comprising:
    reducing an output torque of a hydrostatic motor and that of a transmission input shaft which is connected to the hydrostatic motor,
    disengaging the first said engaged gear of the manual gearbox which is connected downstream,
    determining a rotational speed of the hydrostatic motor and that of the transmission input shaft which is connected to the hydrostatic motor corresponding to the gear to be engaged,
    adjusting the gear ratio of the hydrostatic transmission, so that the rotational speed of the hydrostatic motor and of the transmission input shaft which is connected to the hydrostatic motor is higher than the determined corresponding rotational speed, irrespective of the direction of the gear change, and engaging the second said gear to be engaged; said steps of determining the rotational speed of the hydrostatic motor and of the transmission input shaft, and of adjusting the gear ratio of the hydrostatic transmission being implemented after the disengagement of said first gear and prior to the engagement of said second gear.

2. The method according to claim 1, wherein to reduce the output torque of the hydrostatic motor, its displacement volume is adjusted to a minimum value.

3. The method according to claim 1, wherein to adjust the output torque of the hydrostatic motor and to disengage and engage the gears, electrical signals are output by an electronic control unit.

4. The method according to claim 1, wherein the rotational speed corresponding to the gear to be engaged is determined by an electronic control unit.

5. The method according to claim 4, wherein at least one rotational speed signal about the output rotational speed of the downstream manual gearbox is fed to the electronic control unit.

6. The method according to claim 1, wherein to adjust the rotational speed of the hydrostatic motor to a rotational speed which is above the determined output rotational speed, the displacement volume of the hydrostatic motor is adjusted.

7. The method according to claim 1, wherein to adjust the rotational speed of the hydrostatic motor to a rotational speed which is above the determined rotational speed, a displacement volume of a hydrostatic hydraulic pump unit of the hydrostatic transmission is adjusted.

8. The method according to claim 6, wherein the hydrostatic motor and/or the hydraulic pump unit is adjusted during a positioning movement of an actuating piston to change gears.

* * * * *